UNITED STATES PATENT OFFICE.

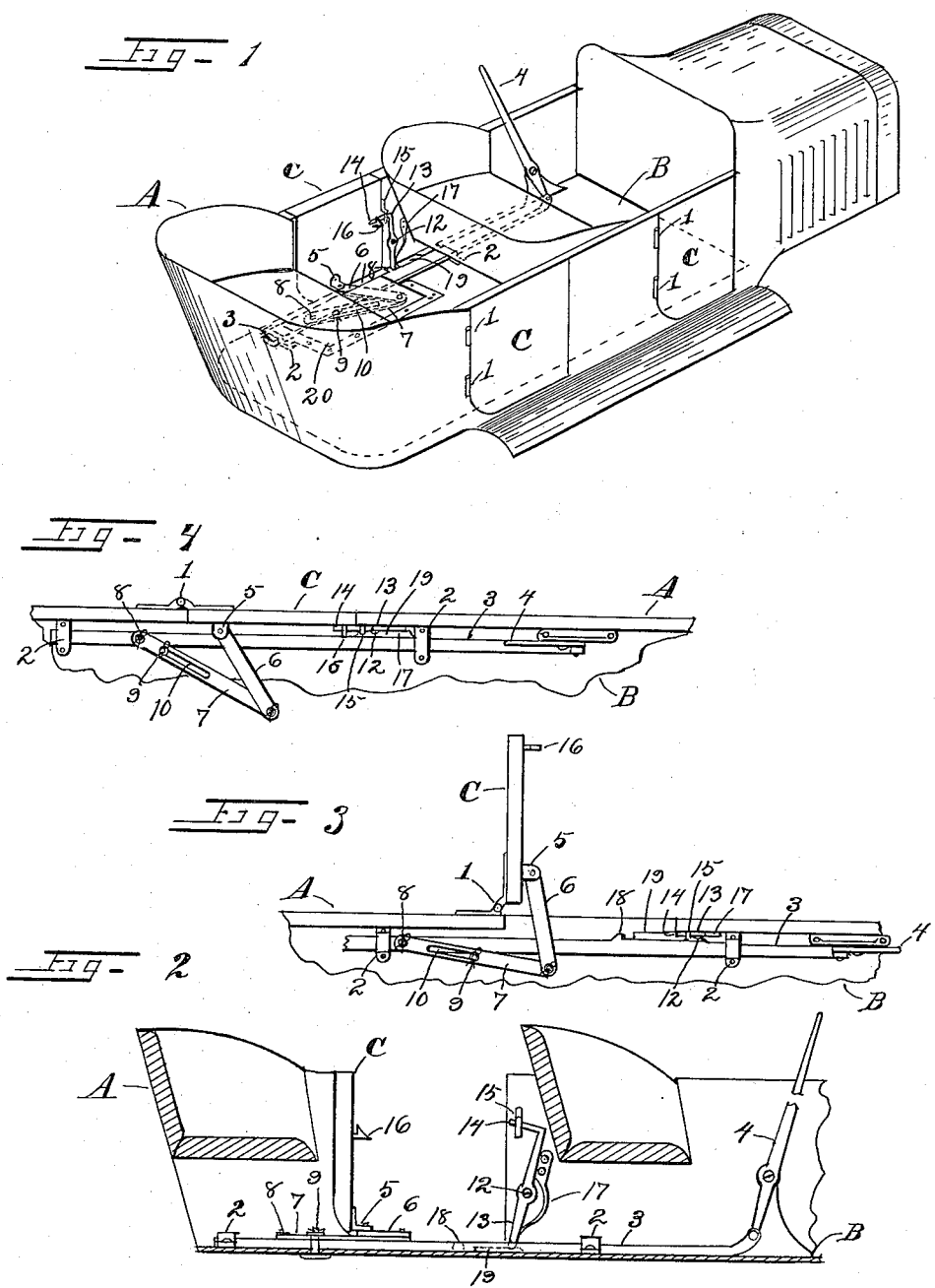

GEORGE H. WEMPLE, OF BATTLE CREEK, MICHIGAN.

DOOR-OPERATING MECHANISM FOR VEHICLES.

1,150,468. Specification of Letters Patent. Patented Aug. 17, 1915.

Application filed January 2, 1914. Serial No. 809,869.

*To all whom it may concern:*

Be it known that I, GEORGE H. WEMPLE, a citizen of the United States, residing at Battle Creek, in the county of Calhoun and State of Michigan, have invented certain new and useful Improvements in Door-Operating Mechanism for Vehicles, of which the following is a specification.

The present invention more particularly relates to means for opening and closing the rear doors of automobiles, although the apparatus could be employed to advantage to vehicles other than automobiles.

As ordinarily constructed it is necessary for a chauffeur to either reach backward or dismount from an automobile to open or close the rear doors thereof.

My invention has for its main object the overcoming of the disadvantage of being obliged to step from a car to open or close the rear doors and at the same time to provide an apparatus for the purpose that will be simple in construction, easily operated, capable of firmly locking the doors when closed and inexpensive to manufacture.

With these ends in view the apparatus will be more fully set forth in the following specification, shown in the accompanying drawing and specifically defined in the appended claims.

In the drawings, Figure 1 represents the body of an automobile in perspective, with my improved door opening and closing apparatus attached to one side thereof and with the doors closed. Fig. 2 is a side view in longitudinal section of an automobile with a door open. Fig. 3 is a detail plan of an automobile with a door opened. Fig. 4 is a detail plan of an automobile with the door closed, showing my improved door opening and closing apparatus.

For convenience in illustrating and describing my improved door opening and closing apparatus I will describe the same as applied to one side of a car, only, with the understanding that in actual use it may be employed to open and close the door of a car from either or both sides thereof.

Like marks of reference refer to corresponding parts throughout the different views in which "A" represents the body of an automobile, "B" the bottom or floor thereof, and "C" the doors thereof supported by suitable hinges 1, 1.

Lying parallel along the side and arranged to slide through the straps 2, 2, attached to the flooring of the automobile, a reciprocative bar 3 is fitted. This bar, by preference, is of thin flat construction and at its forward end is pivotally connected to a fulcrumed lever 4 within convenient range of the chauffeur or front seat attendant, and while I have shown this bar as fitted above the flooring of an automobile and operated by a hand lever, it would be apparent that it could be arranged to slide within bearings below the floor and be operated by a foot or other lever in lieu of the arrangement shown.

Near the bottom of the door and slightly forward of the hinged connection therewith, an eyelet bracket 5 is attached for receiving one end of a short link 6, the opposite end of the link being pivotally connected to a slottel lever 7, the latter of which at its opposite end is pivotally connected to the sliding bar 3 by pin or stud 8. Arranged in close proximity to the hinged door jamb and extending from the floor "B" to the side of the bar 3 opposite from the door, a fixed post 9 is fitted. This post extends through a slot 10 of the lever 7, and is for the purpose of directing the movement of said lever when moved by the bar 3, the bar at its forward end being hinged to a fulcrumed hand lever 4 within easy reach of the operator's seat.

Pivoted to operate on a stud 12 extending from the car side, a vertically-disposed latch lever 13 is suspended. This lever at its upper end has an offset 14 projecting in the direction of the door opening, and by preference it operates through a guideway 15. In the formation of the offset it is by preference made somewhat resilient for the purpose of permitting said offset to lift as the door catch 16 strikes it when the door is being closed, the catch having an inclined face to facilitate the locking of the parts.

To the rear of the latch lever a stop is provided to limit its movement. As shown, I provide a flat leaf spring 17, the heel of which acts as a stop, its free end bearing against the lower end of the lever as a yielding flexible means to prevent the rattling thereof and to also assist in holding the lever unlocked until acted upon.

Upon the inner side of the bar 3 and arranged to catch the lower end of the latch lever 13, an offset 18 is formed. This offset is arranged to catch the lever when the door is at the point of closing and force the lever so that the offset 14 thereof will project within the path of the door catch 16 when the bar 3 is moved forward or toward the front end of the car. By preference the bar 3 has an offset or fin 19 formed on its side in alinement with the offset 18 from which it is spaced sufficiently to permit the lower end of the latch lever 13 to project when the latch is in a vertical or locked contact with a door, as shown in Fig. 1.

In operation, assuming the door to be closed as in Figs. 1 and 4, as the bar 3 is moved rearwardly the slotted lever 10 through the medium of the post 9 will sway the link 6 outwardly, which in turn will push the door outwardly on its hinges, while a reversal of the movement will close the door. In moving the bar rearwardly, as aforesaid, the lever 13 in striking the fin 19, and also from the action of the spring 17, will move the offset 14 of said lever out of engagement with the catch 16 of the door.

Where the operative parts of my improved door opening and closing apparatus is fitted to the floor of a car from the upper side thereof, a metallic or other guard 20 is provided to cover the link 6 and lever 7. The aforesaid parts are of a very thin flat nature and arranged to lie in close proximity to the car floor.

To those skilled in the art to which this invention appertains it will be obvious that minor details in its construction could be modified or altered without departing from the spirit or sacrificing any of its advantages, and I reserve the right to arrange and construct the various elements thereof in such manner as will best serve to obtain the desired results.

Having described my invention what I claim and desire to obtain by Letters Patent, is:

1. In an apparatus of the character described, the combination of a hinged door, a reciprocable bar arranged transversely of the hinge axis of said door, a link pivoted at one end to said door, a longitudinally slotted lever pivoted at one end to said link and at the other end to said bar, a fixed pivot-pin at one side of said bar and fitted in said slotted link, and means for reciprocating said bar whereby said lever is given a compound movement to swing said door.

2. In an apparatus of the character described, the combination of a hinged door, a reciprocable bar arranged transversely of the hinge axis of said door, a link pivoted at one end to said door, a longitudinally slotted lever pivoted at one end to said link and at the opposite end to said bar, a fixed pivot-pin at the side of said bar farthest from said door and to the rear of the hinge axis thereof, the slot of said link fitting over said pivot-pin, means for longitudinally directing said bar, and means for reciprocating said bar whereby said lever is given a compound movement to swing said door.

GEORGE H. WEMPLE.

Witnesses:
 ANNA HAUGHEY,
 THOS. H. THORNE.

Copies of this patent may be obtained for five cents each, by addressing the "Commissioner of Patents, Washington, D. C."